United States Patent
Falcone et al.

(10) Patent No.: US 12,221,013 B2
(45) Date of Patent: Feb. 11, 2025

(54) VEHICLE DRIVE AXLE SYSTEM AND METHOD OF CONTROL

(71) Applicant: ArvinMeritor Technology, LLC, Troy, MI (US)

(72) Inventors: Frank J. Falcone, Escondido, CA (US); Ameya S. Jathar, Escondido, CA (US); Aakash Ahuja, Escondido, CA (US)

(73) Assignee: ArvinMeritor Technology, LLC, Troy, MI (US)

( * ) Notice: Subject to any disclaimer, the term of this patent is extended or adjusted under 35 U.S.C. 154(b) by 286 days.

(21) Appl. No.: 17/950,485

(22) Filed: Sep. 22, 2022

(65) Prior Publication Data

US 2024/0100995 A1    Mar. 28, 2024

(51) Int. Cl.
*B60L 58/26*  (2019.01)
*B60L 58/18*  (2019.01)
*B60L 58/27*  (2019.01)

(52) U.S. Cl.
CPC ............ *B60L 58/26* (2019.02); *B60L 58/18* (2019.02); *B60L 58/27* (2019.02); *B60L 2240/545* (2013.01)

(58) Field of Classification Search
CPC .......... B60L 58/26; B60L 58/18; B60L 58/27; B60L 2240/545; B60L 58/20; B60L 1/02
See application file for complete search history.

(56) References Cited

U.S. PATENT DOCUMENTS

| | | | | |
|---|---|---|---|---|
| 4,662,489 | A  * | 5/1987 | Honekamp | B60T 1/005 188/31 |
| 5,316,106 | A  * | 5/1994 | Baedke | F16N 39/02 184/6.12 |
| 6,997,284 | B1 * | 2/2006 | Nahrwold | F16H 57/0483 165/47 |
| 8,583,307 | B2 * | 11/2013 | Kato | B60K 6/365 903/903 |
| 10,889,205 | B2 | 1/2021 | Hettrich et al. | |
| 10,989,288 | B1 | 4/2021 | Ghatti et al. | |
| 11,002,352 | B2 | 5/2021 | Ghatti et al. | |
| 11,038,396 | B2 | 6/2021 | Raya et al. | |
| 11,207,976 | B2 | 12/2021 | Ghatti et al. | |
| 11,209,072 | B2 | 12/2021 | Ghatti et al. | |
| 11,220,176 | B1 | 1/2022 | Cradit et al. | |
| 11,493,127 | B2 * | 11/2022 | Chen | F16H 61/0403 |

(Continued)

FOREIGN PATENT DOCUMENTS

| | | | | |
|---|---|---|---|---|
| EP | 3919783 A1 * | 12/2021 | | F16H 59/68 |
| EP | 3919783 B1 * | 8/2023 | | F16H 59/68 |

OTHER PUBLICATIONS

Cradit et al., U.S. Appl. No. 17/308,307, filed May 5, 2021, 46 pages.

*Primary Examiner* — Yonel Beaulieu
(74) *Attorney, Agent, or Firm* — Brooks Kushman PC

(57) ABSTRACT

A method of controlling a drive axle system of a vehicle. The temperature of a first electric power source that is configured to store electrical energy and provide electrical energy to an electric motor to provide propulsion torque may be reduced when an upper temperature limit is exceeded. The temperature of the first electric power source may be increased when the temperature is below a lower temperature limit.

20 Claims, 4 Drawing Sheets

(56) References Cited

U.S. PATENT DOCUMENTS

| | | | | |
|---|---|---|---|---|
| 11,680,639 | B1* | 6/2023 | Godo | B60K 1/02 |
| | | | | 477/3 |
| 2011/0031937 | A1* | 2/2011 | Bito | B60W 10/26 |
| | | | | 320/150 |
| 2018/0354490 | A1* | 12/2018 | Moriya | B60W 10/06 |
| 2020/0001837 | A1* | 1/2020 | Neudeck | F16H 63/3416 |
| 2021/0291646 | A1 | 9/2021 | Lorenz et al. | |
| 2021/0354684 | A1* | 11/2021 | Healy | B60L 15/2054 |
| 2023/0074092 | A1* | 3/2023 | Vasanadu | F16H 59/68 |
| 2024/0149859 | A1* | 5/2024 | Cheng | B60K 6/38 |

* cited by examiner

VEHICLE DRIVE AXLE SYSTEM AND METHOD OF CONTROL

TECHNICAL FIELD

This relates to a vehicle drive axle system and a method of control.

BACKGROUND

A thermal management system for a vehicle having an electric powertrain is disclosed in U.S. Pat. No. 10,889,205.

SUMMARY

In at least one embodiment a method of controlling a drive axle system is provided. The method may include determining whether a temperature of a first electric power source is above an upper temperature limit when the first electric power source is being charged by a power supply that is external to the vehicle. The first electric power source is configured to store electrical energy and provide electrical energy to an electric motor to provide vehicle propulsion torque. The temperature of the first electric power source is reduced before entering a hibernation mode when the temperature of the first electric power source exceeds the upper temperature limit.

Reducing the temperature of the first electric power source may include operating a power source thermal management subsystem. The thermal management subsystem may circulate a fluid to remove heat from the first electric power source.

The method may include determining whether the temperature of the first electric power source is below a lower temperature limit. The temperature of the first electric power source may be increased before entering a hibernation mode when the temperature of the first electric power source is below the lower temperature limit. Increasing the temperature of the first electric power source may include operating the power source thermal management subsystem. The thermal management subsystem may circulate a fluid to provide heat to the first electric power source.

The method may include entering the hibernation mode without decreasing or increasing the temperature of the first electric power source when the temperature of the first electric power source does not exceed the upper temperature limit and when the temperature of the first electric power source is not below the lower temperature limit.

In at least one embodiment, a method of controlling a drive axle system of a vehicle is provided. The method includes determining whether a temperature of a first electric power source is above an upper temperature limit when the drive axle system is in a park mode. The vehicle is parked and the first electric power source is not being charged by a power supply that is external to the vehicle when the vehicle is parked. The first electric power source is configured to store electrical energy and provide electrical energy to an electric motor to provide vehicle propulsion torque. The temperature of the first electric power source is reduced when the temperature of the first electric power source exceeds the upper temperature limit.

The method may include transferring electrical energy from the first electric power source to a second electric power source when a thermal preconditioning mode is not activated and the second electric power source is not sufficiently charged. The second electric power source may be configured to store electrical energy. The second electric power source may have a lower voltage capacity than the first electric power source. The second electric power source may not provide electrical energy to the electric motor to provide vehicle propulsion torque.

The method may include determining whether a thermal preconditioning mode is activated before determining whether the temperature of the first electric power source is above the upper temperature limit. The step of determining whether the temperature of the first electric power source is above the upper temperature limit is conducted when the thermal preconditioning mode is activated.

The method may include determining whether the temperature of the first electric power source is below a lower temperature limit. The temperature of the first electric power source may be increased when the temperature of the first electric power source is below the lower temperature limit.

The method may include transferring electrical energy from the first electric power source to the second electric power source when the temperature of the first electric power source does not exceed the upper temperature limit, the temperature of the first electric power source is not below the lower temperature limit, and the second electric power source is not sufficiently charged.

The method may include entering a hibernation mode when the temperature of the first electric power source does not exceed the upper temperature limit, the temperature of the first electric power source is not below the upper temperature limit, and the second electric power source is sufficiently charged.

In at least one embodiment a method of controlling a drive axle system of a vehicle is provided. The method includes determining whether a temperature of a first electric power source is above an upper temperature limit when the drive axle system is in a drive mode. The vehicle is not parked and the first electric power source is not being charged by a power supply when the drive axle system is in the drive mode. The first electric power source is configured to store electrical energy and provide electrical energy to an electric motor to provide vehicle propulsion torque. The temperature of the first electric power source is reduced when the temperature of the first electric power source exceeds the upper temperature limit.

The method may include determining whether the temperature of the first electric power source is below a lower temperature limit and not operating the thermal management subsystem to remove heat from the first electric power source or to provide heat to the first electric power source when the temperature of the first electric power source does not exceed the upper temperature limit and the temperature of the first electric power source is not below the lower temperature limit.

The method may include determining whether the temperature of the first electric power source is less than a predetermined temperature threshold. The first electric power source may be allowed to self-heat when the temperature of the first electric power source is not less than the predetermined temperature threshold.

The method may include determining whether a state of charge of the first electric power source is greater than a threshold value when the temperature of the first electric power source is less than the predetermined temperature threshold. The first electric power source may be allowed to self-heat when the temperature of the first electric power source is not less than the threshold value. The temperature of the first electric power source may be increased when the state of charge is greater than the threshold value. Increasing the temperature of the first electric power source may include operating the power source thermal management system to heat the first electric power source.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a" and "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
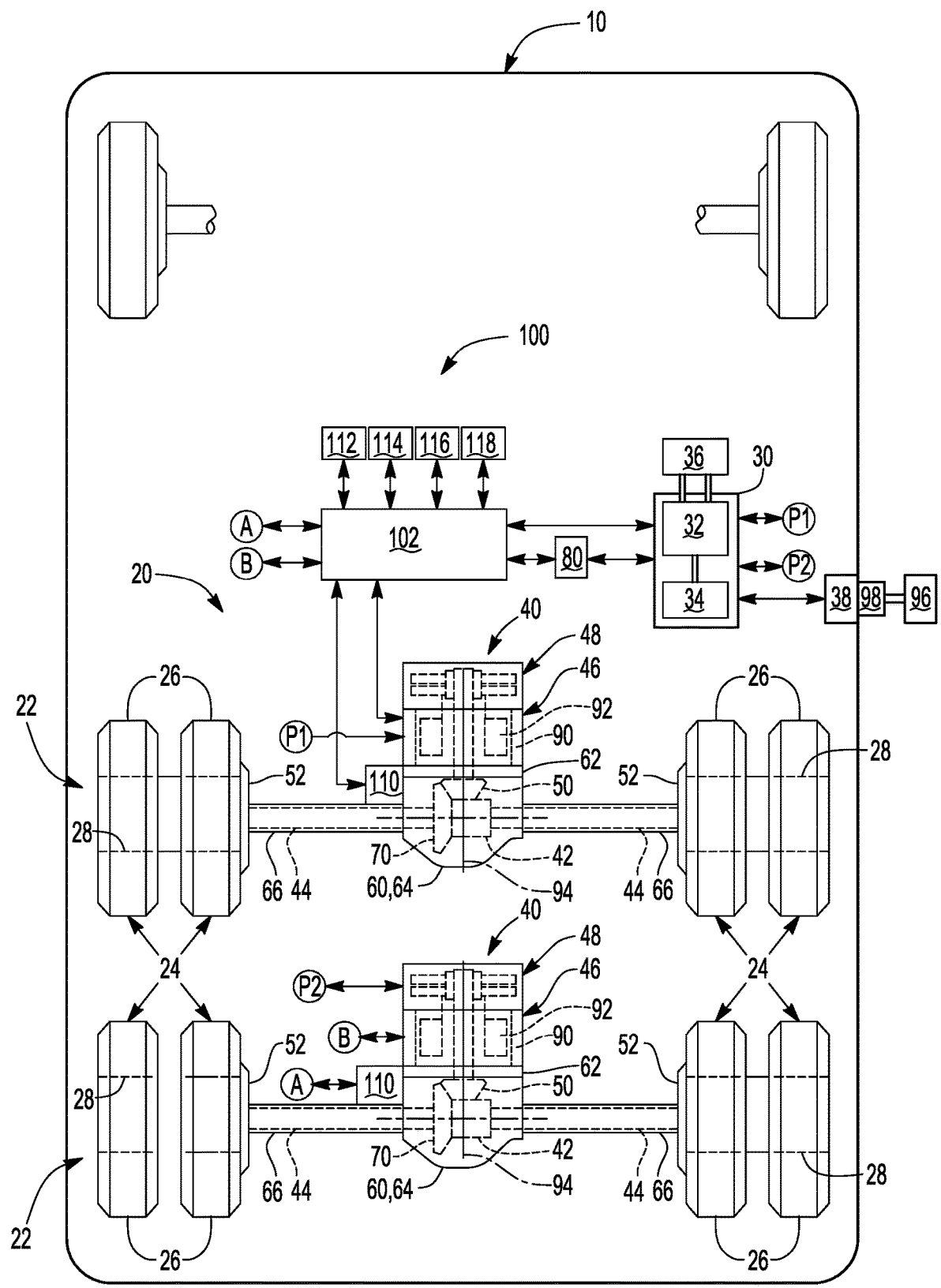
FIG. 1 is a schematic representation of an example of a vehicle that has a drive axle system.

Referring to FIG. 1, an example of a vehicle 10 is shown. The vehicle 10 may be a motor vehicle like a truck, farm equipment, military transport or weaponry vehicle, or cargo loading equipment for land, air, or marine vessels. The vehicle 10 may include a trailer for transporting cargo in one or more embodiments. The vehicle 10 may include a drive axle system 20.

The drive axle system 20 includes one or more axle assemblies 22, such as a front axle assembly and a rear axle assembly. The axle assemblies 22 are illustrated as drive axle assemblies. A drive axle assembly may be configured to provide torque to one or more wheel assemblies 24 that may be rotatably supported on the axle assembly 22. A wheel assembly 24 may include a tire 26 disposed on a wheel 28. The drive axle system 20 includes an electric energy system 30 that includes a first electric power source 32 and a second electric power source 34. A thermal management subsystem 36 and a charge interface 38 may be associated with the electric energy system 30.

In at least one configuration, the front axle assembly 22 and the rear axle assembly 22 may generally be disposed near each other and may be positioned toward the rear of the vehicle 10, similar to a conventional tandem axle arrangement. However, unlike a conventional tandem axle arrangement, the front axle assembly 22 and the rear axle assembly 22 may not be operatively connected to each other and may not receive torque from the same electric motor. As such, the front axle assembly 22 and the rear axle assembly 22 are not connected in series with each other with a shaft, such as a prop shaft that may connect an output of the front axle assembly 22 with an input of the rear axle assembly 22. It is also contemplated that the front axle assembly 22 and the rear axle assembly 22 may be arranged in a different manner, such as with either or both axle assemblies being disposed near the front of the vehicle.

The front axle assembly and the rear axle assembly may have similar or identical configurations. In the configuration shown, both axle assemblies include a housing assembly 40, a differential assembly 42, a pair of axle shafts 44, an electric motor 46, a transmission 48, and a drive pinion 50. In addition, a friction brake 52 may be associated with each wheel assembly 24. The positioning of the differential assembly 42, the electric motor 46, and/or the transmission 48 may differ from that shown. For instance, the differential assembly 42 may be positioned between the electric motor 46 and the transmission 48.

The housing assembly 40 receives various components of the axle assembly 22. In addition, the housing assembly 40 may facilitate mounting of the axle assembly 22 to the vehicle 10. In at least one configuration, the housing assembly 40 may include an axle housing 60 and a differential carrier 62.

The axle housing 60 may receive and support the axle shafts 44. In at least one configuration, the axle housing 60 may include a center portion 64 and at least one arm portion 66.

The center portion 64 may be disposed proximate the center of the axle housing 60. The center portion 64 may define a cavity that may receive the differential assembly 42.

One or more arm portions 66 may extend from the center portion 64. For example, two arm portions 66 may extend in opposite directions from the center portion 64 and away from the differential assembly 42. The arm portions 66 may each have a hollow configuration or tubular configuration that may extend around and may receive a corresponding axle shaft 44 and may help separate or isolate the axle shaft 44 from the surrounding environment. A wheel hub may be rotatably disposed on an arm portion 66 and operatively connected to an axle shaft 44. A wheel assembly 24 is mountable to the wheel hub.

The differential carrier 62 may be mounted to the center portion 64 of the axle housing 60. The differential assembly 42 may be rotatably supported on the differential carrier 62.

The differential assembly 42 is disposed in the housing assembly 40. For instance, the differential assembly 42 may be disposed in the center portion 64 of the axle housing 60. The differential assembly 42 may transmit torque to the axle shafts 44 of the axle assembly 22 and permit the axle shafts 44 and wheel assemblies 24 to rotate at different velocities in a manner known by those skilled in the art. For example, the differential assembly 42 may have a ring gear 70 that may be fixedly mounted on a differential case. The ring gear 70 and the differential case may be rotatable about a differential axis. The differential case may receive differential gears that may be operatively connected to the axle shafts 44.

The axle shafts 44 are configured to transmit torque between the differential assembly 42 and a corresponding wheel hub. For example, two axle shafts 44 may be provided such that each axle shaft 44 extends through a different arm portion 66 of axle housing 60. The axle shafts 44 may be rotatable about an axis, such as a wheel axis or the differential axis.

The electric motor 46 is configured to provide torque, such as propulsion torque or regenerative braking torque. Propulsion torque may be used to propel the vehicle 10, such as in a forward or backward direction. Propulsion torque may also be used to hold the vehicle 10 in a stationary position or to help reduce, limit, or prevent vehicle rollback, such as when the vehicle 10 is on an inclined surface. Regenerative braking may provide a regenerative braking torque, which may also be referred to as regenerative brake torque or regenerative torque. Regenerative braking may capture kinetic energy when the electric motor 46 is used to brake or slow the velocity of the vehicle 10. Recovered energy may be transmitted from the wheel assemblies 24 to drive the electric motor 46. Thus, the electric motor 46 may function as a generator and may be used to charge the first electric power source 32, the second electric power source 34, or both. The electric motor 46 may be electrically connected to the electric energy system 30 via an inverter 80 in a manner known by those skilled in the art.

Examples of electrical connections between the front axle assembly 22 and the electric energy system 30 and between the rear axle assembly 22 and the electric energy system 30 are represented with connection symbols P1 and P2, respectively. In the configuration shown, the electric energy system 30 is electrically connected to both axle assemblies 22; however, it is contemplated that each axle assembly 22 may be electrically connected to a different electric energy system 30 or different electric power sources. For instance, a first energy storage system may be electrically connected to a first axle assembly but not to a second axle assembly while a second energy storage system may be electrically connected to the second axle assembly but not to the first axle assembly.

The electric motor 46 may be mounted to or positioned inside of the housing assembly 40. The electric motor 46 includes a stator 90 and a rotor 92. The stator 90 may be fixedly positioned with respect to the housing assembly 40. The stator 90 may encircle the rotor 92. The rotor 92 is rotatable about an axis 94 with respect to the stator 90.

The transmission 48 facilitates the transmission of torque between the electric motor 46 and the drive pinion 50. Torque transmission may be bidirectional. The transmission 48 may provide gear reduction and multiple gear ratios between the rotor 92 and the drive pinion 50. The transmission 48 may be of any suitable type. For instance, transmission 48 may be a countershaft transmission, an epicyclic transmission (e.g., a transmission having a planetary gear set), or the like. A countershaft transmission may include a single countershaft or multiple countershafts. Examples of an axle assembly having a single countershaft transmission are disclosed in U.S. Pat. Nos. 11,002,352 and 11,209,072. Examples of an axle assembly having a dual countershaft transmission is disclosed in U.S. Pat. Nos. 10,989,288, 11,207,976, and 11,220,176. Examples of an axle assembly having an epicyclic transmission are disclosed in U.S. Pat. No. 11,038,396 and U.S. patent application Ser. No. 17/308,307. The disclosures of the references in the preceding three sentences are hereby incorporated in their entirety by reference herein.

The drive pinion 50 operatively connects the differential assembly 42 and the transmission 48. The drive pinion 50 may be received in the housing assembly 40 and may transmit torque between the differential assembly 42 and the transmission 48. The drive pinion 50 may be rotatable about an axis, such as the axis 94, and may have a gear portion that has teeth that meshes with teeth of the ring gear 70 of the differential assembly 42. Torque that is provided by the electric motor 46 to the transmission 48 and to the drive pinion 50 may be transmitted to the ring gear 70 and thus to the differential assembly 42.

The friction brake 52 is configured to provide a friction brake torque that inhibits rotation or that resists or slows rotation of a wheel assembly 24. A friction brake 52 may be mounted to each arm portion 66 proximate a wheel hub that facilitates mounting of a wheel assembly 24 The friction brake 52 may be of any suitable type, such as a disc brake or a drum brake. In addition, the friction brake 52 may be actuated in any suitable manner, such as being hydraulically actuated, electrically actuated, pneumatically actuated, or the like.

The electric energy system 30 is disposed on the vehicle 10. The electric energy system 30 is configured to store and supply electrical energy. Electrical energy may be stored in the first electric power source 32 and the second electric power source 34. Electrical energy may be provided to the electric energy system 30 to charge the first electric power source 32, the second electric power source 34, or both. For example, electrical energy may be provided to the electric energy system 30 when the electric motor 46 is operating as a generator. Electrical energy may also be provided to the electric energy system 30 from a power supply 96 that is not the electric motor 46. The power supply 96 may be external to the vehicle 10 and may be connectable to the vehicle 10 via the charge interface 38. It is also contemplated that the power supply 96 may be disposed on the vehicle 10.

The first electric power source 32 is configured to provide electrical energy to propel the vehicle 10. The first electric power source 32, which may also be referred to as a traction battery or an energy storage system (ESS), may be a high-voltage power source that may include a plurality of electrical energy storage devices, such as battery cells, capacitors, or the like. The first electric power source 32 may have a higher storage capacity than the second electric power source 34.

The second electric power source 34 is configured to provide electrical energy for non-propulsion functions, including but not limited to vehicle startup, vehicle systems monitoring, vehicle access, lighting, audio system, and the like. The second electric power source 34, which may be referred to as a low-voltage power source or low-voltage battery, may be a low-voltage power source that may have a lower voltage capacity or provide a lower voltage of electrical energy than the first electric power source 32. As a nonlimiting example, the second electric power source 34 may be a battery, including but not limited to a nominally rated 12V battery. The second electric power source 34 may be electrically connectable to the first electric power source 32 via a DC/DC connection.

The thermal management subsystem 36 is configured to heat and cool the first electric power source 32. The thermal management subsystem 36 may have any suitable configuration. For instance, the thermal management subsystem 36 may be configured to heat a fluid, such as a water/ethylene glycol mixture, refrigerant, or the like, and circulate the fluid through or around the first electric power source 32 to heat the first electric power source 32. The thermal management subsystem 36 may also be configured to cool the fluid and circulate the fluid through or around the first electric power source 32 to cool the first electric power source 32. The fluid may or may not change phases. In at least one configuration, the thermal management subsystem 36 may include a pump, compressor, heat pump, or the like, that may circulate the fluid and at least one heat exchanger that may facilitate heat transfer to and from the fluid. The thermal management subsystem 36 may be configured as a heat pump subsystem in one or more configurations.

The charge interface 38 may facilitate charging of the electric energy system 30 or the transfer of electric energy from a power supply 96 that is external to the vehicle 10 to the electric energy system 30. The power supply 96 that is external to the vehicle may be of any suitable type, such as a Level 1 (120 V) charger, Level 2 (240 V) charger, Direct Current (DC) fast charger, or the like. The charge interface 38 may be configured to provide an electrical interface with the power supply 96. For instance, the charge interface 38 may be a receptacle that is engageable with a plug 98 that is connected to the power supply 96 via an electrical cord. It is also contemplated that the charge interface 38 may not employ a plug-in connection but instead may facilitate inductive charging or the like. It is also contemplated that the power supply 96 may include solar cells that are provided with the vehicle 10.

A control system 100 controls operation of the drive axle system 20. For example, the control system 100 may include one or more microprocessor-based control modules or controllers 102 that may be electrically connected to or communicate with components of the vehicle 10 and/or the axle assembly 22, such as the electric motor 46, the friction brakes 52, the inverter 80, etc. Control system connections are represented by the double arrowed lines associated with the controller 102 in FIG. 1 as well as by connection symbols A and B. The control system 100 may also monitor and control the electric energy system 30. In addition, the control system 100 may also process input signals or data from various input devices or sensors. These input devices may include a speed sensor 110, an accelerator pedal 112, a brake pedal 114, at least one input device 116, a parking brake sensor 118, or combinations thereof.

The speed sensor 110 provides a signal indicative of the speed of the vehicle. For instance, the speed sensor 110 may provide a signal indicative of the rotational speed or rotational velocity of a rotatable component disposed downstream from the transmission 48, such as the rotational speed of a wheel assembly 24, the axle shaft 44, the drive pinion 50, or the like. In at least one configuration, the speed sensor 110 may be mounted to the axle assembly 22 and may detect rotation of a wheel hub and thus may be indicative of wheel speed.

The accelerator pedal 112 provides a signal that is indicative of a request for acceleration the vehicle 10. The signal provided by the accelerator pedal 112 may be used by the controller 102 to control the electric motor 46. For instance, the controller 102 may control the electric motor 46 to provide propulsion torque based on the signal from the accelerator pedal 112. The accelerator pedal 112 may be operated by a driver or operator of the vehicle 10 to request acceleration and deceleration of the vehicle 10. The accelerator pedal 112 may have any suitable configuration. For example, the accelerator pedal 112 may be a foot-operated pedal that may be mounted near the floor of the passenger compartment of the vehicle 10 or may be a hand-operated pedal that may be provided in another location, such as proximate a steering wheel or control console of the vehicle 10. The accelerator pedal 112 may be moveable between a first position and a second position. The first position may be a released position in which the accelerator pedal 112 is not actuated or depressed by the driver. The first position may correspond with a 0% pedal position when expressed as a percentage. The second position may be a fully actuated or "full throttle" position in which the accelerator pedal 112 is actuated or depressed by the driver to its fullest extent. The second position may correspond with a 100% pedal position when expressed as a percentage. The pedal may also be actuated to multiple intermediate positions between the first position and the second position. These intermediate positions may correspond to pedal positions that are greater than 0% and less than 100% when expressed as a percentage. It is also contemplated that autonomous driving system or cruise control system may provide a signal that is indicative of a request for acceleration of the vehicle 10 and thus function as an accelerator pedal. Accordingly, the term accelerator pedal as used herein also encompasses such systems.

The brake pedal 114 provides a signal that is indicative of a request for deceleration the vehicle 10. The signal provided by the brake pedal 114 may be used by the controller 102 to control the friction brake 52, to request regenerative brake torque be provided by the electric motor 46, or both. For instance, the controller 102 may control a brake actuator that actuates the friction brake 52 to provide a friction brake torque based on the signal from the brake pedal 114. The brake pedal 114 may be operated by a driver of the vehicle 10 to request deceleration of the vehicle 10. The brake pedal 114 may have any suitable configuration. For instance, the brake pedal 114 may be a foot-operated pedal that may be mounted near the floor of the passenger compartment of the vehicle 10 or may be a hand-operated pedal that may be provided in another location, such as proximate a steering wheel or control console of the vehicle 10. The brake pedal 114 may be moveable between a first position and a second position. The first position may be a released position in which the brake pedal 114 is not actuated or depressed by the driver. The first position may correspond with a 0% pedal position when expressed as a percentage. The second position may be a fully actuated position in which the brake pedal 114 is actuated or depressed by the driver to its fullest extent. The second position may correspond with a 100% pedal position when expressed as a percentage. The pedal may also be actuated to multiple intermediate positions between the first position and the second position. These intermediate positions may correspond to pedal positions that are greater than 0% and less than 100% when expressed as a percentage. It is also contemplated that autonomous driving system or cruise control system may provide a signal that is indicative of a request for deceleration of the vehicle 10 and thus function as a brake pedal. Accordingly, the term brake pedal as used herein also encompasses such systems.

It is also contemplated that a single pedal may provide a signal or signals indicative of a request for acceleration or a request for deceleration rather than two pedals. Such a configuration in referred to as a "one-pedal" driving system. Thus, the terms accelerator pedal and brake pedal as used herein also encompasses one-pedal driving system in which a single pedal can be used to request acceleration and deceleration of the vehicle.

At least one input device 116 may be provided with the vehicle 10. The input device 116 may be of any suitable type, such as a button, switch, lever, touchscreen, or the like. In at least one configuration, an input device 116 provides a signal of a vehicle operating mode that is selected by a vehicle operator. For instance, the input device 116 may allow the vehicle operator to activate or deactivate a drive mode or park mode of the vehicle 10. As an example, the input device 116 may provide a signal is indicative of or similar to an automatic transmission shifter setting. For instance, the input device 116 may detect an input that is indicative of or operationally equivalent to a park setting (P), reverse setting (R), drive setting (D), a low speed setting (L), or combinations thereof. An input device 116 may also allow the vehicle operator to activate or deactivate the thermal management subsystem 36.

The parking brake sensor 118 provides a signal that is indicative of application of a parking brake or request for engagement of a parking brake. The parking brake may hold the vehicle 10 in a stationary position when the vehicle 10 is parked. The friction brake 52 may function as the parking brake. The friction brake 52 may be actuated to function as the parking brake using a pedal or input device other than the brake pedal 114. For instance, the parking brake sensor 118 may provide a signal that is indicative of actuation of a parking brake pedal, switch, or other input device that is used to request activation or deactivation of the parking brake. It is also contemplated that the parking brake sensor 118 may directly detect actuation or retraction of the friction brake 52 in addition to or in place of detecting a parking brake pedal, switch, or the like.

Referring to FIGS. 2-5, flowcharts associated with a method or methods of controlling a vehicle and a drive axle system is shown. As will be appreciated by one of ordinary skill in the art, the flowcharts may represent control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multitasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the scope of the present invention. Method steps may be executed by the control system 100 and may be implemented as a closed loop control system.

As an overview, an electric vehicle or vehicle that has an axle assembly that is propelled by an electric motor rather than an internal combustion engine can utilize a first electric power source for vehicle propulsion and a second electric power source for various non-propulsion purposes. The temperature of an electric power source affects its performance. Moreover, using the same thermal management strategy to control or alter the temperature of an electric power source when the vehicle 10 is in different operating modes, such as a charge mode, a park mode, and a drive mode, can waste energy. The present invention tailors thermal management actions that modify the temperature of an electric power source to the vehicle operating mode to help avoid wasting energy and to improve performance.

Figure 2:
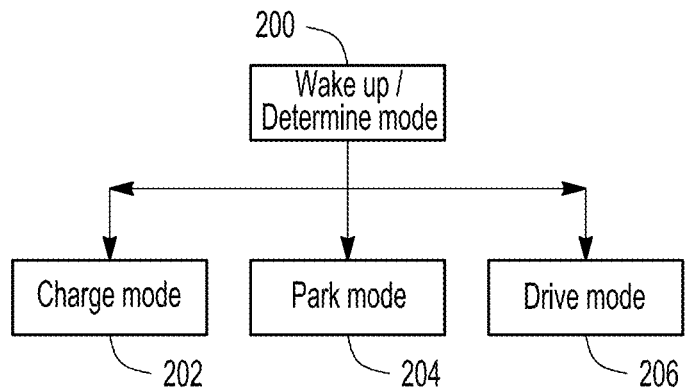
FIG. 2 is a flowchart associated with operational modes of the drive axle system.

Referring to FIG. 2, a flowchart is shown that outlines various vehicle and drive axle system operating modes. These modes include a charge mode, a park mode, and a drive mode. The controller 102 may determine which mode is active based on one or more signals or inputs that are indicative of the current operating state of the vehicle 10 or drive axle system 20.

At block 200, the control system 100 may determine whether it is in a charge mode, park mode, or drive mode. This determination may be made when the control system 100 wakes up from a hibernating state or hibernating mode or when the vehicle is not in a hibernating mode. For example, the vehicle 10 may be in a hibernating mode when the vehicle is parked and is not actively being charged and may periodically to assess the condition of the electric energy system 30.

Block 202 represents the charge mode. The vehicle 10 or drive axle system 20 may be in the charge mode when the first electric power source 32 is electrically connected to the power supply 96 and is being charged. Optionally, the second electric power source 34 may also be electrically connected to the power supply 96 and being charged in the charge mode. The charge mode may be based on detection of the plug 98 being electrically connected to the charge interface 38, when there is communication between the power supply 96 and the vehicle 10, or combinations thereof. Charging detection may be based on a signal indicative of current flow from the power supply 96 to the electric energy system 30. Additional signals may also be used to determine or supplement the determination as to whether the vehicle 10 is in the charge mode. For instance, the vehicle 10 may be in the charge mode when the vehicle 10 is stationary and in a parked state. The vehicle 10 may be stationary when the vehicle is not moving, which may be based on the signal from the speed sensor 110. The vehicle 10 may be in a parked state based on a signal from the input device 116 that indicates that the vehicle 10 is in a park setting (P) or a neutral setting (N).

Block 204 represents the park mode. The vehicle 10 or drive axle system 20 may be in the park mode when the electric energy system 30 is not being charged by the power supply 96. The electric energy system 30 is not being charged when the electric energy system 30 is not electrically connected to the power supply 96, such as when the vehicle is not "plugged in" (e.g., when the plug 98 is not electrically connected to the charge interface 38, when there is no communication between the power supply 96 and the vehicle 10, when there is no signal indicative of current flow from the power supply 96 to the electric energy system 30, or combinations thereof). In addition, the vehicle 10 may be in the park mode when the vehicle 10 is in a parked state. The parked state may be based on a signal from the input device(s) 116 that indicates that the vehicle 10 is in a park setting (P) or a neutral setting (N), a signal from the parking brake sensor 118 that indicates that the parking brake has been activated, or combinations thereof. The vehicle 10 may also be in the park mode when the vehicle 10 is stationary, which may be based on the signal from the speed sensor 110. However, it is noted that the park mode may not be determined based on vehicle speed alone as the vehicle 10 may be unplugged and stationary when the vehicle is in the park mode or when the vehicle 10 is in the drive mode and is stopped, such as at a stoplight.

Block 206 represents the drive mode. The vehicle 10 or drive axle system 20 be in the drive mode when the electric energy system 30 is not being charged by the power supply 96 (e.g., not electrically connected to the power supply 96, not plugged in, etc.) as previously described. In addition, the vehicle 10 may be in the drive mode when the vehicle 10 is not in a parked state. For instance, the vehicle 10 may not be in the parked state when the vehicle is started. The vehicle 10 may be started when the brake pedal 114 is depressed and a command indicative of a request to start the vehicle is detected, such as by depressing or actuating a start button that is provided with the vehicle 10 or a key fob to start the vehicle 10, by turning the key to a "key on" position, or the like. Other inputs may also be used to determine or supplement the determination as to whether the vehicle 10 is in the drive mode, such as whether the transmission 48 is in gear, the parking brake is released, or both. The vehicle 10 may or may not be stationary when in the drive mode.

Figure 3:
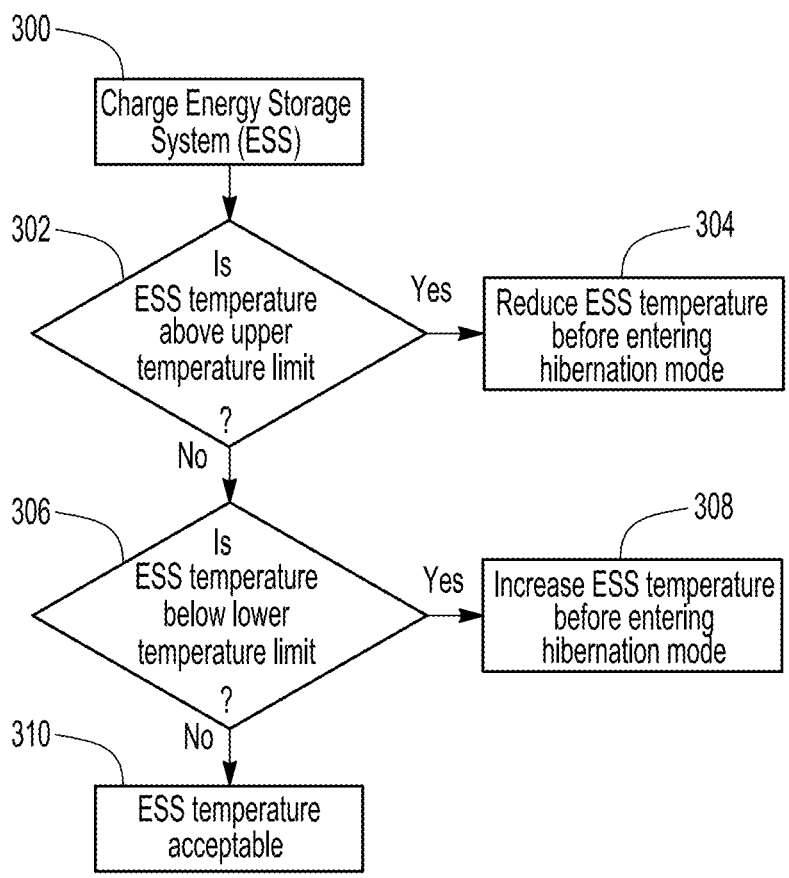
FIG. 3 is a flowchart of a method of control associated with a charge mode.
Figure 4:
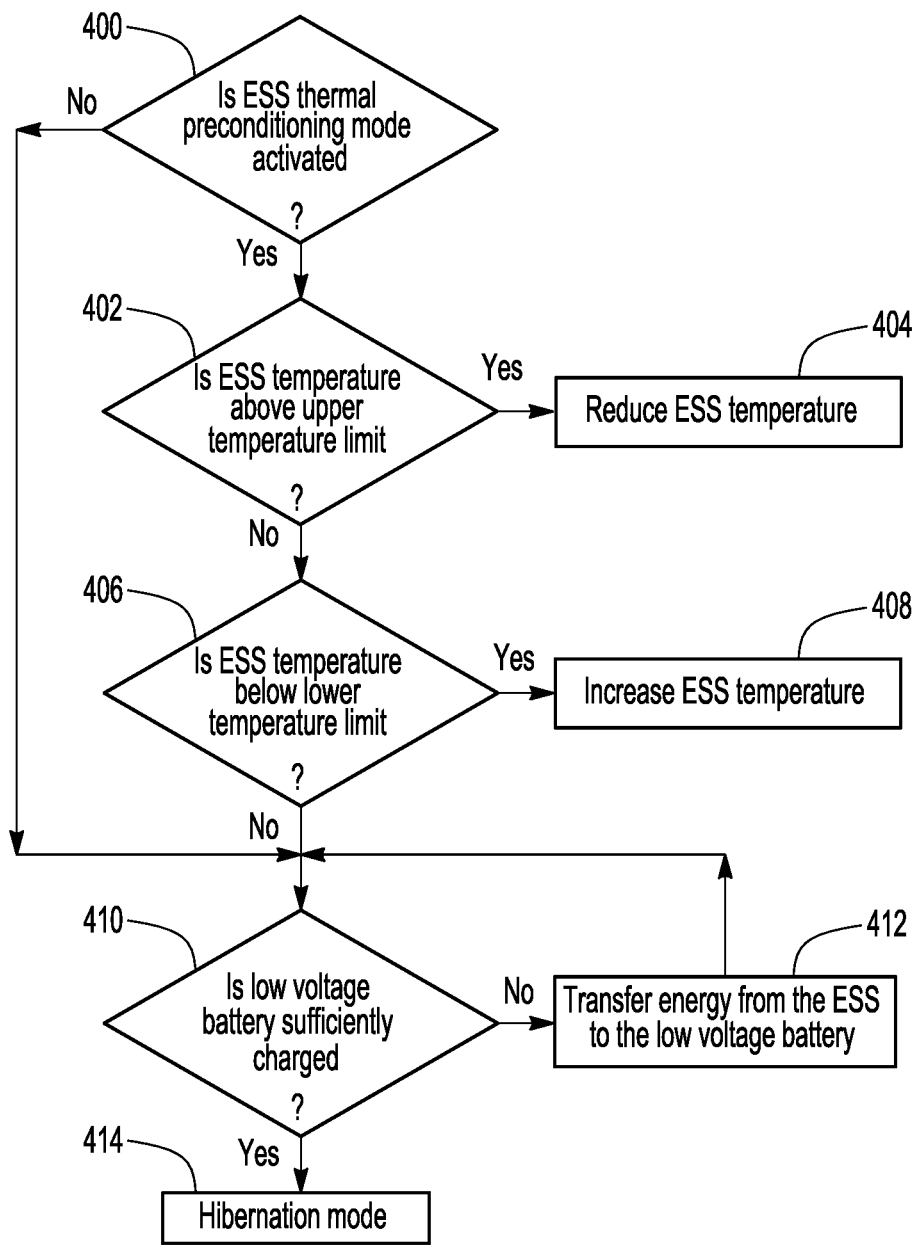
FIG. 4 is a flowchart of a method of control associated with a park mode.
Figure 5:
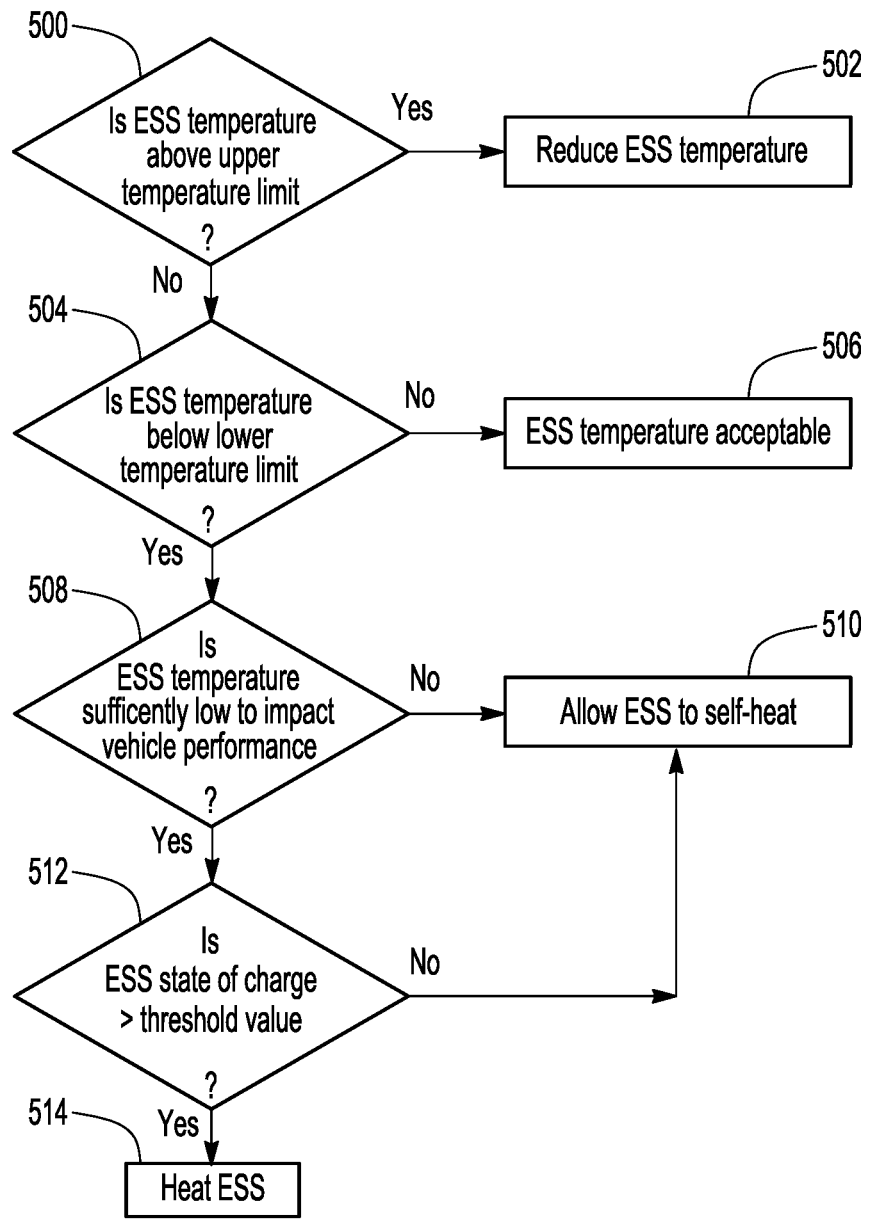
FIG. 5 is a flowchart of a method of control associated with a drive mode.

Referring to FIGS. 3-5, methods of control associated with each mode will now be discussed. It is noted that the methods shown in FIGS. 3-5 may be executed independently or in combination.

Referring to FIG. 3, a method of control associated with the charge mode is shown.

At block 300, the method may begin with the first electric power source 32 (i.e., ESS) being charged with electrical energy from the power supply 96.

At block 302, the method determines whether the temperature of the first electric power source 32 is above an upper temperature limit. The upper temperature limit may be based on the operating characteristics and performance attributes of the first electric power source 32. In at least one configuration, the upper temperature limit may be a constant temperature value. As a nonlimiting example, the upper temperature limit may be a temperature between 35° C. and 50° C., such as 45° C. It is also contemplated that the upper temperature limit may be a variable temperature value. If the temperature of the first electric power source 32 is above the upper temperature limit, then the method may continue at block 304. If the temperature of the first electric power source 32 is not above the upper temperature limit, then the method may continue at block 306.

At block 304, the temperature of the first electric power source 32 is reduced before entering a hibernation mode. The temperature of the first electric power source 32 may be reduced by operating the thermal management subsystem 36 in a manner that cools or reduces the temperature of the first electric power source 32 as previously discussed.

The hibernation mode may be a mode that is entered when the electric energy system 30 has stored a sufficient amount of electrical energy and when the vehicle 10 is not started. For instance, the hibernation mode may be entered when the state of charge of the first electric power source 32, the second electric power source 34, or both is complete or deemed to be sufficiently high or "fully charged" noting that full charge limits may be dynamic and may change during the useful life of the first electric power source 32. In the hibernation mode, the vehicle 10 may be in a standby state or quiet state in which vehicle propulsion and charging systems are turned off (e.g., the first electric power source 32 is not being charged and electrical energy is not being used to propel the vehicle 10 or provide torque to the vehicle wheels). However, the control system 100 may periodically wake up to check the status of the vehicle systems and may be ready to respond to a command to start the vehicle when the hibernation mode is active.

At block 306, the method determines whether the temperature of the first electric power source 32 is below a lower temperature limit. The lower temperature limit may be based on the operating characteristics and performance attributes of the first electric power source 32. In at least one configuration, the lower temperature limit may be a constant temperature value. As a nonlimiting example, the lower temperature limit may be a temperature that is between 15° C. and 25° C., such as 20° C. It is also contemplated that the lower temperature limit may be a variable temperature value. If the temperature of the first electric power source is below the lower temperature limit, then the method may continue at block 308. If the temperature of the first electric power source 32 is not below the lower temperature limit, then the method may continue at block 310.

At block 308, the temperature of the first electric power source 32 is increased before entering the hibernation mode. The temperature of the first electric power source 32 may be increased by operating the thermal management subsystem 36 in a manner that heats or increases the temperature of the first electric power source 32 as previously discussed.

At block 310, the temperature of the first electric power source 32 is below the upper temperature limit and above the lower temperature limit. As such, the temperature of the first electric power source 32 is considered to be acceptable and the thermal management subsystem 36 is not operated to heat or cool the first electric power source 32. As such, the hibernation mode may be entered or activated without operating the thermal management subsystem 36 to thermally condition the first electric power source 32 during charging or once charging is complete and immediately prior to entering the hibernation mode.

Referring to FIG. 4, a method of control associated with the park mode is shown. It is noted that this method may be used periodically when the control system wakes from a hibernation mode, such as to check the state or condition of the first electric power source and the second electric power source.

At block 400, the method determines whether a thermal preconditioning mode is activated. The thermal preconditioning mode enables the thermal management subsystem 36 to heat or cool the first electric power source 32 (i.e., ESS). The thermal preconditioning mode may be activated by vehicle operator using the input device 116 as previously discussed. It is also contemplated that the thermal preconditioning mode may be automatically activated or deactivated. For instance, the thermal preconditioning mode may be deactivated automatically based on the location of the vehicle 10, which may be indicative of when the vehicle 10 is expected to be driven in climates where the first electric power source 32 is unlikely to exceed its upper temperature limit or fall below its lower temperature limit. If the thermal preconditioning mode is activated, then the method may continue at block 402. If the thermal preconditioning mode is not activated, then the method may continue at block 410.

At block 402, the method determines whether the temperature of the first electric power source 32 is above the upper temperature limit. The step is analogous to block 302. If the temperature of the first electric power source 32 is above the upper temperature limit, then the method may continue at block 404. If the temperature of the first electric power source 32 is not above the upper temperature limit, the method may continue at block 406.

At block 404, the temperature of the first electric power source 32 is reduced. The temperature of the first electric power source 32 may be reduced by operating the thermal management subsystem 36 in a manner that cools or reduces the temperature of the first electric power source 32.

At block 406, the method determines whether the temperature of the first electric power source 32 is below the lower temperature limit. The step is analogous to block 306. If the temperature of the first electric power source 32 is below the lower temperature limit, then the method may continue at block 408. If the temperature of the first electric power source 32 is not below the lower temperature limit, the method may continue at block 410.

At block 408, the temperature of the first electric power source 32 is increased. The temperature of the first electric power source 32 may be increased by operating the thermal management subsystem 36 in a manner that heats or increases the temperature of the first electric power source 32.

At block 410, the method determines whether the second electric power source 34 (e.g., low-voltage battery) is sufficiently charged. The controller 102 may determine whether the second electric power source 34 is sufficiently charged by comparing the state of charge of the second electric power source 34 with a predetermined limit. The predetermined limit may be based on the operating characteristics and performance attributes of the second electric power source 34 and the performance demands of the drive axle system 20. As one example, the predetermined limit may be based on voltage. For instance, the voltage available from the second electric power source 34 may be compared to a predetermined voltage limit, such as 10V. In this example, the second electric power source 34 may be sufficiently charged when the voltage available from the second electric power source 34 is greater than or equal to predetermined voltage limit and may not be sufficiently charged when the voltage available from the second electric power source 34 is less than the predetermined voltage limit. If the second electric power source 34 is not sufficiently charged, then the method may continue at block 412. If the second electric power source 34 is sufficiently charged, the method may continue at block 414.

At block 412, electrical energy may be transferred from the first electric power source 32 to the second electric power source 34 to charge the second electric power source 34. Electrical energy may be transferred from the first electric power source 32 to the second electric power source 34 for a predetermined period of time, until the predetermined limit is reached, or the like, which is represented by the arrowed line from block 412 to block 410. The second electric power source 34 may be charged is to help ensure that the second electric power source 34 has sufficient energy to permit the vehicle to wake up or start in response to a command to do so and/or to perform its non-propulsion functions when the vehicle is in the hibernation mode and park mode.

At block 414, the hibernation mode may be entered or activated.

Referring to FIG. 5, a method of control associated with the drive mode is shown.

At block 500, the method determines whether the temperature of the first electric power source 32 is above the upper temperature limit. The step is analogous to block 402. If the temperature of the first electric power source 32 is above the upper temperature limit, then the method may continue at block 502. If the temperature of the first electric power source 32 is not above the upper temperature limit, then the method may continue at block 504.

At block 502, the temperature of the first electric power source 32 is reduced. The temperature of the first electric power source 32 may be reduced by operating the thermal management subsystem 36 in a manner that cools or reduces the temperature of the first electric power source 32.

At block 504, the method determines whether the temperature of the first electric power source 32 is below the lower temperature limit. The step is similar to block 406. If the temperature of the first electric power source 32 is not below the lower temperature limit, then the method may continue at block 506. If the temperature of the first electric power source 32 is below the lower temperature limit, then the method may continue at block 508.

At block 506, the temperature of the first electric power source 32 is below the upper temperature limit and above the lower temperature limit. As such, the temperature of the first electric power source 32 is considered to be acceptable and the thermal management subsystem 36 is not operated to heat or cool the first electric power source 32, similar to block 310.

At block 508, the method determines whether the temperature of the first electric power source 32 is sufficiently low so as to impact vehicle performance. The temperature of the first electric power source 32 may be sufficiently low when the temperature of the first electric power source 32 is below a predetermined temperature threshold. The predetermined temperature threshold may be a constant or variable value that may be based on vehicle development testing. For instance, the predetermined temperature threshold may be based on how far the temperature the first electric power source 32 is below the lower temperature limit. The impact on vehicle performance may increase as the temperature of the first electric power source 32 decreases. As a nonlimiting example, if the lower temperature limit is 20° C., then the predetermined temperature threshold may be a value that is less than 20° C., such as 10° C. The first electric power source 32 may not impact vehicle performance when the temperature of the first electric power source 32 is greater than the predetermined temperature threshold and may impact vehicle performance when the temperature of the first electric power source is less than or equal to the predetermined temperature threshold. If the temperature of the first electric power source 32 is not sufficiently low to impact vehicle performance, then the method may continue at block 510. If the temperature of the first electric power source 32 is sufficiently low to impact vehicle performance, then the method may continue at block 512.

At block 510, the first electric power source 32 is allowed to self-heat, or heat without operating the thermal management subsystem 36. The first electric power source 32 may self-heat by discharging energy to facilitate propulsion of the vehicle 10 or may self-heat during charging, such as when electrical energy is recovered by regenerative braking and used to charge the first electric power source 32.

At block 512, the method determines whether the state of charge of the first electric power source 32 is greater than a threshold value. This step may be used to determine whether the first electric power source 32 has sufficient energy to operate the thermal management subsystem 36 to heat the first electric power source 32 but without reducing its charge to the point where there may be a meaningful or noticeable impact on propulsion performance. For instance, it would not make sense to use electrical energy from the first electric power source 32 operate the thermal management subsystem 36 and then have insufficient electrical energy to provide the propulsion torque requested by the vehicle operator. The threshold value may be a predetermined value that is based on vehicle development testing. For instance, the predetermined value may be a constant that may be based on the state of charge. As a nonlimiting example, the threshold value may be a state of charge of 20%. If the state of charge of the first electric power source 32 is lest than or equal to the threshold value, then the method may continue at block 510 where the first electric power source 32 is allowed to self-heat. If the state of charge of the first electric power source 32 is greater than the threshold value, then the method may continue at block 514.

At block 514, the first electric power source 32 is heated. The first electric power source 32 may be heated using the thermal management subsystem 36 as previously discussed.

A drive axle system and method of control as described above may allow different thermal management strategies to be used for different operating modes, which may make more efficient use of the electrical energy available and improve vehicle performance. Thermal management strategies may be intellegently implemented to actively heat or cool an electric power source when the temperature is outside of a temperature limit or sufficiently impacts performance. The method may also help ensure that a low voltage battery is sufficiently charged before entering a hibernation mode and is kept at a sufficiently charged state after waking periodically to check the condition of the low voltage battery.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a drive axle system of a vehicle, the method comprising:
    determining whether a temperature of a first electric power source of the drive axle system is above an upper temperature limit when the first electric power source is being charged by a power supply that is external to the vehicle, wherein the first electric power source is configured to store electrical energy and provide electrical energy to an electric motor to provide vehicle propulsion torque; and
    reducing the temperature of the first electric power source before entering a hibernation mode when the temperature of the first electric power source exceeds the upper temperature limit.

2. The method of claim 1 wherein reducing the temperature of the first electric power source includes operating a thermal management subsystem to circulate a fluid to remove heat from the first electric power source.

3. The method of claim 1 further comprising:
    determining whether the temperature of the first electric power source is below a lower temperature limit; and
    increasing the temperature of the first electric power source before entering the hibernation mode when the temperature of the first electric power source is below the lower temperature limit.

4. The method of claim 3 wherein increasing the temperature of the first electric power source includes operating a thermal management subsystem to circulate a fluid to provide heat to the first electric power source.

5. The method of claim 3 further comprising entering the hibernation mode without decreasing or increasing the temperature of the first electric power source when the temperature of the first electric power source does not exceed the upper temperature limit and when the temperature of the first electric power source is not below the lower temperature limit.

6. A method of controlling a drive axle system of a vehicle, the method comprising:
    determining whether a temperature of a first electric power source of the drive axle system is above an upper temperature limit when the drive axle system is in a park mode in which the vehicle is parked and the first electric power source is not being charged by a power supply that is external to the vehicle, wherein the first electric power source is configured to store electrical energy and provide electrical energy to an electric motor to provide vehicle propulsion torque; and
    reducing the temperature of the first electric power source when the temperature of the first electric power source exceeds the upper temperature limit.

7. The method of claim 6 further comprising transferring electrical energy from the first electric power source to a second electric power source when a thermal preconditioning mode is not activated and the second electric power source is not sufficiently charged, wherein the second electric power source is configured to store electrical energy, has a lower voltage capacity than the first electric power source, and does not provide electrical energy to the electric motor to provide vehicle propulsion torque.

8. The method of claim 6 further comprising determining whether a thermal preconditioning mode is activated before determining whether the temperature of the first electric power source is above the upper temperature limit, wherein the step of determining whether the temperature of the first electric power source is above the upper temperature limit is conducted when the thermal preconditioning mode is activated.

9. The method of claim 6 further comprising:
    determining whether the temperature of the first electric power source is below a lower temperature limit; and
    increasing the temperature of the first electric power source when the temperature of the first electric power source is below the lower temperature limit.

10. The method of claim 9 further comprising transferring electrical energy from the first electric power source to a second electric power source when the temperature of the first electric power source does not exceed the upper temperature limit, the temperature of the first electric power source is not below the lower temperature limit, and the second electric power source is not sufficiently charged.

11. The method of claim 10 wherein the second electric power source is configured to store electrical energy, has a lower voltage capacity than the first electric power source, and does not provide electrical energy to the electric motor to provide vehicle propulsion torque.

12. The method of claim 10 further comprising entering a hibernation mode when the temperature of the first electric power source does not exceed the upper temperature limit, the temperature of the first electric power source is not below the lower temperature limit, and the second electric power source is sufficiently charged.

13. A method of controlling a drive axle system of a vehicle, the method comprising:
determining whether a temperature of a first electric power source of the drive axle system is above an upper temperature limit when the drive axle system is in a drive mode in which the vehicle is not parked and the first electric power source is not being charged by a power supply that is external to the vehicle, wherein the first electric power source is configured to store electrical energy and provide electrical energy to an electric motor to provide vehicle propulsion torque; and
reducing the temperature of the first electric power source when the temperature of the first electric power source exceeds the upper temperature limit.

14. The method of claim 13 wherein reducing the temperature of the first electric power source includes operating a thermal management subsystem to circulate a fluid to remove heat from the first electric power source.

15. The method of claim 14 further comprising:
determining whether the temperature of the first electric power source is below a lower temperature limit; and
not operating the thermal management subsystem to remove heat from the first electric power source or to provide heat to the first electric power source when the temperature of the first electric power source does not exceed the upper temperature limit and the temperature of the first electric power source is not below the lower temperature limit.

16. The method of claim 15 further comprising determining whether the temperature of the first electric power source is less than a predetermined temperature threshold and allowing the first electric power source to self-heat when the temperature of the first electric power source is not less than the predetermined temperature threshold.

17. The method of claim 16 further comprising determining whether a state of charge of the first electric power source is greater than a threshold value when the temperature of the first electric power source is less than the predetermined temperature threshold.

18. The method of claim 17 further comprising allowing the first electric power source to self-heat when the temperature of the first electric power source is not less than the threshold value.

19. The method of claim 17 further comprising increasing the temperature of the first electric power source when the state of charge is greater than the threshold value.

20. The method of claim 19 wherein increasing the temperature of the first electric power source includes operating the thermal management subsystem to heat the first electric power source.

* * * * *